United States Patent
Bowen

(10) Patent No.: US 10,652,166 B2
(45) Date of Patent: May 12, 2020

(54) NON-REAL TIME ADAPTIVE BITRATE RECORDING SCHEDULER

(71) Applicant: Cisco Technology, Inc., San Jose, CA (US)

(72) Inventor: Gareth John Bowen, Chandlers Ford (GB)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 15/633,802

(22) Filed: Jun. 27, 2017

(65) Prior Publication Data

US 2018/0375792 A1 Dec. 27, 2018

(51) Int. Cl.
*H04L 12/911* (2013.01)
*H04L 29/06* (2006.01)
*H04L 12/825* (2013.01)

(52) U.S. Cl.
CPC ........ *H04L 47/821* (2013.01); *H04L 65/4084* (2013.01); *H04L 65/60* (2013.01);
(Continued)

(58) Field of Classification Search
CPC ....... H04L 47/25; H04L 47/821; H04L 65/60; H04L 65/607; H04L 65/80; H04L 65/605; H04L 47/14; H04L 65/601; H04L 47/125; H04L 67/2823; H04L 67/32; H04N 21/8456; H04N 21/2402; H04N 21/44209; H04N 21/6373; H04N 21/26258; H04N 21/2662; H04N 21/4334; H04N 21/4621;
(Continued)

(56) References Cited

U.S. PATENT DOCUMENTS 6,470,016 B1* 10/2002 Kalkunte ............ H04L 47/2433
370/395.41
7,269,330 B1* 9/2007 Iggulden .............. H04H 60/375
348/460

(Continued)

FOREIGN PATENT DOCUMENTS

WO 01/99370 12/2001

OTHER PUBLICATIONS

Jiang, Junchen et al.; Improving Fairness, Efficiency, and Stability in HTTP-Based Adaptive Video Streaming With Festive (Jun. 14, 2012).

*Primary Examiner* — Greg C Bengzon
(74) *Attorney, Agent, or Firm* — Merchant & Gould P.C.

(57) ABSTRACT

In one embodiment, a system is described, having a processor to receive a request for download of a high priority adaptive bitrate (ABR) content item which is available for download at a higher bit rate and a lower bit rate, and a request for a download of a low priority ABR content item, which is also available for download at a higher bit rate and a lower bit rate. A byte acquisition scheduler determines a required bandwidth to download the high priority ABR content item without adapting to the lower bit rate, and determines a remaining bandwidth to download the low priority ABR content item. A download interface interfaces with an ABR server, downloads the high priority ABR content item and the low priority ABR content item, and allocates at least the required bandwidth and up to the remaining bandwidth. Related systems, apparatuses and methods are also described.

15 Claims, 13 Drawing Sheets

(52) U.S. Cl.
CPC ............ *H04L 65/602* (2013.01); *H04L 65/80* (2013.01); *H04L 47/25* (2013.01)

(58) Field of Classification Search
CPC ......... H04N 21/64738; H04N 21/4147; H04N 21/44008; H04N 21/6125; H04N 21/2187; H04N 21/23406; H04N 21/23605; H04N 21/23805; H04N 21/2385; H04N 21/26233; H04N 21/6379; H04N 21/64769; H04N 21/845; H04N 19/00; H04N 19/156; H04N 19/184; H04N 21/234; H04N 21/23418; H04N 21/2343; H04N 21/234345; H04N 21/236; H04N 21/23611; H04N 21/262; H04N 21/4307; H04N 21/436; H04N 21/4402; H04N 21/440245; H04N 21/44227; H04N 21/44245; H04N 21/4622; H04N 21/47205; H04N 21/6131; H04N 21/6143

See application file for complete search history.

(56) References Cited

U.S. PATENT DOCUMENTS

| | | | | |
|---|---|---|---|---|
| 7,783,773 | B2* | 8/2010 | Wu | H04L 65/80 709/203 |
| 7,921,217 | B2* | 4/2011 | Yan | H04L 67/1019 709/217 |
| 8,205,004 | B1* | 6/2012 | Kaufman | H04L 65/607 375/240 |
| 8,583,818 | B2* | 11/2013 | Dhruv | H04N 21/26233 709/231 |
| 9,061,207 | B2* | 6/2015 | Perlman | A63F 13/12 |
| 9,191,322 | B2* | 11/2015 | Schlack | H04L 47/10 |
| 9,294,526 | B2* | 3/2016 | George | H04L 65/4069 |
| 9,516,085 | B2* | 12/2016 | McCarthy | H04N 21/8456 |
| 9,521,177 | B2* | 12/2016 | Gahm | H04L 47/11 |
| 9,544,344 | B2* | 1/2017 | Ramamurthy | H04N 21/23439 |
| 9,680,902 | B2* | 6/2017 | Yu | H04L 65/607 |
| 9,712,408 | B2* | 7/2017 | Phillips | H04L 43/08 |
| 9,781,377 | B2* | 10/2017 | Poniatowski | H04N 21/278 |
| 9,936,267 | B2* | 4/2018 | Shivadas | H04N 21/23439 |
| 9,986,008 | B2* | 5/2018 | Ramamurthy | H04L 65/60 |
| 9,992,499 | B2* | 6/2018 | Su | H04N 19/142 |
| 10,069,885 | B2* | 9/2018 | Dasher | H04L 65/60 |
| 10,194,183 | B2* | 1/2019 | Major | H04N 21/2402 |
| 10,419,787 | B2* | 9/2019 | Li | H04L 65/602 |
| 2002/0144260 | A1* | 10/2002 | Devara | H04N 21/2221 725/32 |
| 2003/0002439 | A1* | 1/2003 | Lee | H04L 12/5602 370/229 |
| 2003/0236904 | A1* | 12/2003 | Walpole | H04L 12/1881 709/231 |
| 2004/0160961 | A1 | 8/2004 | Duckering et al. | |
| 2008/0060029 | A1* | 3/2008 | Park | G11B 27/034 725/89 |
| 2008/0119286 | A1* | 5/2008 | Brunstetter | A63F 13/00 463/43 |
| 2008/0195743 | A1* | 8/2008 | Brueck | H04L 29/06027 709/231 |
| 2008/0301746 | A1* | 12/2008 | Wiser | H04N 7/17318 725/114 |
| 2009/0043906 | A1* | 2/2009 | Hurst | H04N 21/23439 709/231 |
| 2010/0031162 | A1* | 2/2010 | Wiser | G06Q 30/0255 715/747 |
| 2010/0142915 | A1* | 6/2010 | McDermott | G11B 27/034 386/343 |
| 2010/0166062 | A1* | 7/2010 | Perlman | A63F 13/12 375/240.05 |
| 2010/0166065 | A1* | 7/2010 | Perlman | A63F 13/12 375/240.07 |
| 2010/0316050 | A1* | 12/2010 | Baykal | H04L 12/185 370/390 |
| 2011/0058490 | A1* | 3/2011 | Mills | H04L 12/1886 370/252 |
| 2011/0096828 | A1* | 4/2011 | Chen | H04N 21/23106 375/240.02 |
| 2011/0150099 | A1* | 6/2011 | Owen | H04N 21/23406 375/240.26 |
| 2011/0231519 | A1* | 9/2011 | Luby | H04N 21/23106 709/219 |
| 2011/0231569 | A1* | 9/2011 | Luby | H04L 65/607 709/234 |
| 2011/0238789 | A1* | 9/2011 | Luby | H04L 67/02 709/219 |
| 2011/0239078 | A1* | 9/2011 | Luby | H04N 21/234327 714/752 |
| 2011/0274179 | A1* | 11/2011 | Holden | H04N 21/23109 375/240.25 |
| 2011/0307929 | A1* | 12/2011 | Youssefmir | H04N 21/23106 725/89 |
| 2012/0016965 | A1* | 1/2012 | Chen | H04N 21/23439 709/219 |
| 2012/0173748 | A1* | 7/2012 | Bouazizi | H04L 65/4084 709/231 |
| 2012/0177101 | A1* | 7/2012 | van der Schaar | H04N 19/115 375/240.01 |
| 2012/0259994 | A1* | 10/2012 | Gillies | H04L 12/1881 709/231 |
| 2012/0317189 | A1* | 12/2012 | Einarsson | H04L 65/4084 709/203 |
| 2013/0007223 | A1* | 1/2013 | Luby | H04N 21/23106 709/219 |
| 2013/0013803 | A1* | 1/2013 | Bichot | H04L 65/1046 709/231 |
| 2013/0058480 | A1* | 3/2013 | Ziskind | H04N 21/4331 380/200 |
| 2013/0089142 | A1* | 4/2013 | Begen | H04N 21/23424 375/240.12 |
| 2013/0091251 | A1* | 4/2013 | Walker | H04N 21/6125 709/219 |
| 2013/0091297 | A1* | 4/2013 | Minder | H04N 21/23439 709/231 |
| 2013/0103849 | A1* | 4/2013 | Mao | H04N 21/8456 709/231 |
| 2013/0160058 | A1* | 6/2013 | Albal | H04N 21/23805 725/62 |
| 2013/0166765 | A1* | 6/2013 | Kaufman | H04L 65/4084 709/231 |
| 2013/0246643 | A1* | 9/2013 | Luby | H04N 21/23439 709/231 |
| 2013/0262694 | A1* | 10/2013 | Swaminathan | H04L 65/4084 709/231 |
| 2013/0263201 | A1* | 10/2013 | Chung-How | H04L 1/0003 725/116 |
| 2013/0311668 | A1* | 11/2013 | Akhtar | H04L 65/60 709/231 |
| 2014/0019633 | A1* | 1/2014 | Zhang | H04L 65/601 709/231 |
| 2014/0089452 | A1* | 3/2014 | Beck | H04N 21/8456 709/213 |
| 2014/0112635 | A1* | 4/2014 | Kelley | H04N 5/775 386/230 |
| 2014/0119428 | A1* | 5/2014 | Catchpole | H04N 21/47217 375/240.02 |
| 2014/0201324 | A1* | 7/2014 | Zhang | H04L 65/4084 709/217 |
| 2014/0215085 | A1 | 7/2014 | Li | |
| 2014/0280749 | A1 | 9/2014 | Arana et al. | |
| 2014/0281000 | A1 | 9/2014 | Dattagupta et al. | |
| 2014/0317241 | A1* | 10/2014 | Zhao | H04L 65/608 709/219 |
| 2015/0052437 | A1* | 2/2015 | Crawford | H04N 21/2543 715/720 |
| 2015/0071075 | A1* | 3/2015 | Ramakrishnan | H04L 65/4069 370/236 |

(56) References Cited

U.S. PATENT DOCUMENTS

| | | | |
|---|---|---|---|
| 2015/0095450 A1* | 4/2015 | Vitthaladevuni | H04L 47/25 709/217 |
| 2015/0100702 A1* | 4/2015 | Krishna | H04N 21/23439 709/231 |
| 2015/0101003 A1* | 4/2015 | Bull | H04N 21/64761 725/116 |
| 2015/0146778 A1* | 5/2015 | De Cicco | H04N 19/149 375/240.07 |
| 2015/0163273 A1* | 6/2015 | Radcliffe | H04L 65/602 709/231 |
| 2015/0200986 A1* | 7/2015 | Stockhammer | H04L 65/4069 709/219 |
| 2015/0207841 A1* | 7/2015 | Drang | H04N 21/23109 709/219 |
| 2015/0249622 A1* | 9/2015 | Phillips | H04L 65/4084 709/219 |
| 2015/0256906 A1* | 9/2015 | Jones | H04L 65/4076 725/109 |
| 2015/0271231 A1* | 9/2015 | Luby | H04L 65/604 709/231 |
| 2015/0271237 A1* | 9/2015 | Stockhammer | H04N 21/235 709/219 |
| 2015/0282000 A1* | 10/2015 | Andersson | H04L 65/4084 370/230 |
| 2015/0288617 A1* | 10/2015 | Dasher | H04L 47/801 709/226 |
| 2015/0312303 A1* | 10/2015 | Krishna | H04L 65/80 709/219 |
| 2015/0341412 A1* | 11/2015 | Marchand | H04L 65/602 709/219 |
| 2015/0358373 A1* | 12/2015 | Famaey | H04N 21/26258 709/231 |
| 2015/0382034 A1* | 12/2015 | Thangaraj | H04N 19/40 709/231 |
| 2016/0028594 A1* | 1/2016 | Ramakrishnan | H04L 41/5009 709/224 |
| 2016/0028595 A1* | 1/2016 | Ramakrishnan | H04L 41/5025 709/226 |
| 2016/0028647 A1* | 1/2016 | Ramakrishnan | H04L 47/783 709/226 |
| 2016/0028651 A1* | 1/2016 | Ramakrishnan | H04N 21/234354 709/226 |
| 2016/0050241 A1* | 2/2016 | Lotfallah | H04L 67/2804 709/219 |
| 2016/0050246 A1* | 2/2016 | Liao | H04W 8/082 709/219 |
| 2016/0065995 A1* | 3/2016 | Phillips | H04N 21/238 725/62 |
| 2016/0072637 A1* | 3/2016 | Gholmieh | H04L 65/4076 709/219 |
| 2016/0072864 A1* | 3/2016 | Houdaille | H04L 43/0894 709/231 |
| 2016/0112732 A1* | 4/2016 | Li | H04L 65/605 725/116 |
| 2016/0119404 A1* | 4/2016 | Bowen | G06Q 10/0631 709/217 |
| 2016/0134673 A1* | 5/2016 | MacInnis | H04L 65/60 709/231 |
| 2016/0198012 A1* | 7/2016 | Fablet | H04L 67/26 709/231 |
| 2016/0198161 A1* | 7/2016 | Samuelsson | H04N 21/23439 375/240.27 |
| 2016/0205158 A1* | 7/2016 | Lo | H04L 65/4076 709/219 |
| 2016/0211002 A1* | 7/2016 | Tada | G11B 27/19 |
| 2016/0212452 A1* | 7/2016 | Tada | H04N 21/26233 |
| 2016/0255131 A1* | 9/2016 | Bulava | H04L 65/605 709/219 |
| 2016/0261661 A1* | 9/2016 | Taibi | H04L 65/605 |
| 2016/0286247 A1* | 9/2016 | Phillips | H04N 21/2385 |
| 2016/0286248 A1* | 9/2016 | Phillips | H04N 21/2385 |
| 2016/0286249 A1* | 9/2016 | Phillips | H04N 21/2385 |
| 2016/0308934 A1* | 10/2016 | Gholmieh | H04L 67/02 |
| 2016/0308958 A1* | 10/2016 | Navali | H04N 21/2662 |
| 2016/0309241 A1* | 10/2016 | Ljung | H04W 52/0209 |
| 2016/0337424 A1* | 11/2016 | Mandyam | H04L 65/4076 |
| 2016/0337680 A1* | 11/2016 | Kalagi | H04N 21/2662 |
| 2016/0373324 A1* | 12/2016 | Gholmieh | H04L 65/4076 |
| 2017/0034545 A1* | 2/2017 | Rozenberg | H04N 21/2402 |
| 2017/0034589 A1* | 2/2017 | Rozenberg | H04N 21/64322 |
| 2017/0070551 A1* | 3/2017 | Phillips | H04N 21/6373 |
| 2017/0070757 A1* | 3/2017 | Phillips | H04N 21/2385 |
| 2017/0070758 A1* | 3/2017 | Phillips | H04N 21/2385 |
| 2017/0070773 A1* | 3/2017 | Phillips | H04N 21/4302 |
| 2017/0126256 A1* | 5/2017 | Salomons | H04L 1/0009 |
| 2017/0156015 A1* | 6/2017 | Stockhammer | H04S 3/006 |
| 2017/0171103 A1* | 6/2017 | Gouache | H04N 21/23439 |
| 2017/0171264 A1* | 6/2017 | Salomons | H04N 21/2402 |
| 2017/0171287 A1* | 6/2017 | Famaey | H04L 65/4084 |
| 2017/0171589 A1* | 6/2017 | Phillips | G11B 27/10 |
| 2017/0180817 A1* | 6/2017 | Thompson | H04N 21/6587 |
| 2017/0188072 A1* | 6/2017 | Major | H04N 21/2402 |
| 2017/0195393 A1* | 7/2017 | Su | H04L 43/0888 |
| 2017/0223074 A1* | 8/2017 | Degrange | G06F 13/4068 |
| 2017/0223081 A1* | 8/2017 | Degrange | H04L 65/602 |
| 2017/0223424 A1* | 8/2017 | Degrange | H04N 21/23439 |
| 2017/0331875 A1* | 11/2017 | Houze | H04L 65/80 |
| 2017/0332116 A1* | 11/2017 | Lee | H04N 21/236 |
| 2017/0339207 A1* | 11/2017 | Mueller | H04L 65/608 |
| 2017/0366833 A1* | 12/2017 | Amidei | H04N 21/23439 |
| 2018/0007395 A1* | 1/2018 | Ugur | H04N 21/23439 |
| 2018/0109468 A1* | 4/2018 | Sridhar | H04L 5/006 |
| 2018/0109743 A1* | 4/2018 | Oh | H04N 5/355 |
| 2018/0212882 A1* | 7/2018 | Phillips | H04L 47/125 |
| 2018/0375915 A1* | 12/2018 | Sridhar | H04L 41/5067 |
| 2019/0028524 A1* | 1/2019 | Salomons | H04N 21/2402 |
| 2019/0306551 A1* | 10/2019 | Arye | H04L 65/601 |

* cited by examiner

NON-REAL TIME ADAPTIVE BITRATE RECORDING SCHEDULER

TECHNICAL FIELD

The present disclosure generally relates to systems, methods, and apparatus for adaptive bitrate streaming environments.

BACKGROUND

Adaptive Bitrate Streaming is a technique used in streaming multimedia over computer networks. While in the past most video streaming technologies used either file download, progressive download, or custom streaming protocols, most of today's adaptive streaming technologies are based on utilizing hypertext transfer protocol (HTTP) requests and methods to download content. HTTP requests and methods are designed to work efficiently over large distributed HTTP networks such as may be found on the Internet.

HTTP-based Adaptive Streaming (HAS) operates by tracking a user's bandwidth and CPU capacity, and then selecting an appropriate representation (e.g., bandwidth and resolution) to stream among the available bitrates and resolutions. Typically, HAS leverages the use of an encoder that can encode a single source video at multiple bitrates and resolutions, wherein said encoding can be representative of either constant bitrate encoding (CBR) or variable bitrate encoding (VBR). A player client can switch among the different encodings or representation depending on available resources. Ideally, the result of utilizing HAS is that there is little buffering, fast start times, and good video quality experiences for both high-bandwidth and low-bandwidth connections.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a system, apparatus and method is described, the system having a processor operative to receive a request for a download of at least one high priority adaptive bitrate (ABR) content item and a request for a download of at least one low priority ABR content item, the at least one high priority ABR content item being available for download at a first higher bit rate and at a first lower bit rate, and the at least one lower ABR content item being available for download at a second higher bit rate and at a second lower bit rate. The system also having a byte acquisition scheduler operative to determine a required bandwidth to download the at least one high priority ABR content item without adapting to the first lower bit rate, and determine a remaining bandwidth to download the at least one low priority ABR content item on the basis of an available bandwidth for downloading ABR content and the required bandwidth. The system further having a download interface operative to interface with at least one ABR server external to the system, download the at least one high priority ABR content item and the at least one low priority ABR content item, and allocate, based on the available bandwidth, at least the required bandwidth and up to the remaining bandwidth. Related systems, apparatuses and methods are also described.

Example Embodiments

Figure 1:
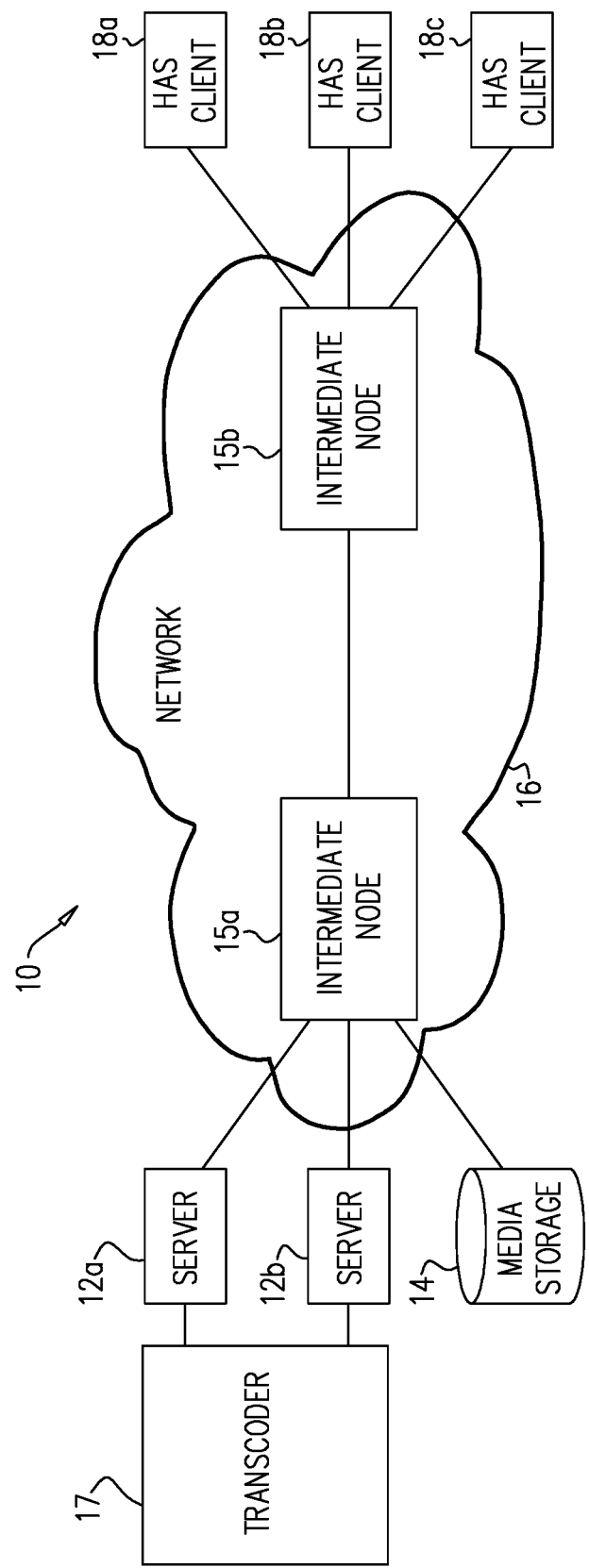
FIG. 1 is a simplified block diagram of a communication system for providing bitrate adaptation in adaptive bitrate streaming environments in accordance with one embodiment of the present disclosure.

Reference is now made to FIG. 1, which is a simplified block diagram of a communication system 10 for providing bitrate adaptation in adaptive bitrate (ABR) streaming environments in accordance with one embodiment of the present disclosure. The communication system 10 of FIG. 1 is configured for providing bitrate adaptation for a plurality of HTTP-based Adaptive Streaming (HAS) clients 18*a-c*. The Communication system 10 may include a plurality of servers 12*a-b*, media storage 14, a network 16, a transcoder 17, a plurality of HAS clients 18*a-c*, and a plurality of intermediate nodes 15*a-b*. Note that an originating video source may be a transcoder that takes a single encoded source and "transcodes" it into a plurality of content items at multiple bitrates, or the originating video source could be a "Primary" encoder that takes an original non-encoded video source and directly produces the plurality of content items at multiple bitrates. Therefore, it should be understood that transcoder 17 is representative of any appropriate type of multi-rate encoder, transcoder, etc.

The servers 12*a-b* are configured to deliver content to HAS clients 18*a-c* upon request of the HAS clients 18*a-c*. The requested content may include any suitable information and/or data that can propagate in the network 16 (e.g., video, audio, media, metadata, any type of streaming information, etc.). Certain content may be stored in media storage 14, which can be located anywhere appropriate in the network 16. For example, media storage 14 may be a part of a Web server, or may be logically connected to one of servers 12a-b, and may be suitably accessed using the network 16, etc. In general, the communication system 10 can be configured to provide downloading and streaming capabilities associated with various data services. The communication system 10 can also offer the ability to manage content for mixed-media offerings, which may combine video, audio, games, applications, channels, and programs into digital media bundles.

In ABR streaming, a source video is encoded such that multiple instances of the same content is available for streaming at a number of different bitrates. The multiple instances can be encoded via either multi-rate coding, such as H.264 AVC, or layered coding, such as H.264 SVC). Content for streaming to the HAS clients 18a-c can be divided into "segments", each segment typically two (2) to ten (10) seconds in length. HAS clients 18a-c can access the segments stored on servers (or produced in near real time for live streaming) using a Web paradigm (e.g., HTTP GET operations over a TCP/IP transport), and the HAS clients 18a-c depend on the reliability, congestion control, and flow control features of TCP/IP for data delivery. HAS clients 18a-c can indirectly monitor the performance of fetch operations by monitoring the delivery bitrate and/or buffer fill level. HAS clients 18a-c use observed performance in order to determine to either:
  upshift to a higher encoding bitrate to obtain better quality when bandwidth is available;
  to downshift in order to avoid buffer underruns and the consequent video stalls when available bandwidth decreases; or
  to stay at the same bitrate if available bandwidth does not change.

Compared to non-adaptive systems such as classic cable TV or broadcast services, adaptive streaming systems typically use significantly larger amounts of buffering to absorb the effects of varying bandwidth from the network.

In a typical ABR streaming scenario, HAS clients 18a-c fetch content in segments from one of the servers 12a-b. Each segment can contain a portion of a program, typically comprising a few seconds of program content. [Note that the terms 'segment', 'fragment', and 'chunk' are often used interchangeably in the art. It is appreciated that this usage may be convenient at times, but is not necessarily precise, in that there are differences between how different ABR streaming protocols use these terms.]

With most adaptive streaming technologies, it is common practice to have every segment represent the same, or very nearly the same, interval of program time. For example, in the case of one streaming protocol, it is common practice to have every segment of a program represent almost exactly 2 seconds worth of content for the program. With HTTP Live Streaming (HLS), it is quite common practice to have every segment of a program represent almost exactly 10 seconds worth of content. Although it is also possible to encode segments with different durations (e.g., using 6-second segments for HLS instead of 10-second segments), even when this is done, it is nevertheless common practice to keep segments within a program of the same duration.

Figure 2:
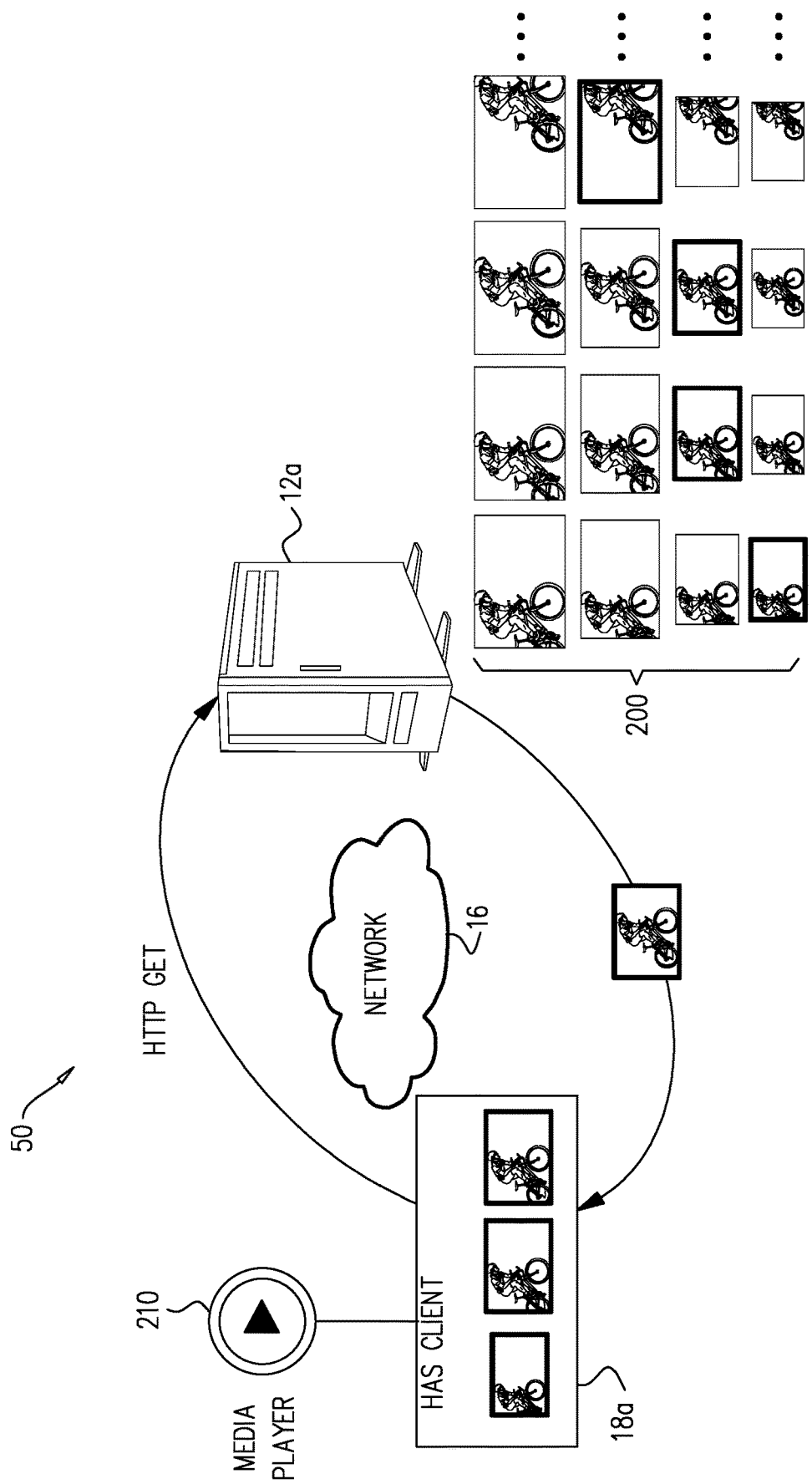
FIG. 2 is a simplified partly block diagram partly pictorial illustrating a possible adaptive bitrate streaming scenario in accordance with the system of FIG. 1.

Reference is now made to FIG. 2, which is a simplified block diagram illustrating a possible ABR streaming scenario in accordance with the system of FIG. 1. FIG. 2 depicts an environment 50 for providing adaptive video streaming over HTTP. The server 12a is able to provide, upon request, to client devices (such as HAS client 18a) a plurality of segments 200 available at differing encoding bitrates.

The HAS client 18a can download available segments of the plurality of segments 200 from the server 12a in any order using HTTP GET operations, measure the available bandwidth based on the download history, and select the video bitrate of the next segment on-the-fly based on video bitrates of available segments at the server 12a. Upon download, segments which are received are available for playing at a media player 210.

Figure 3:
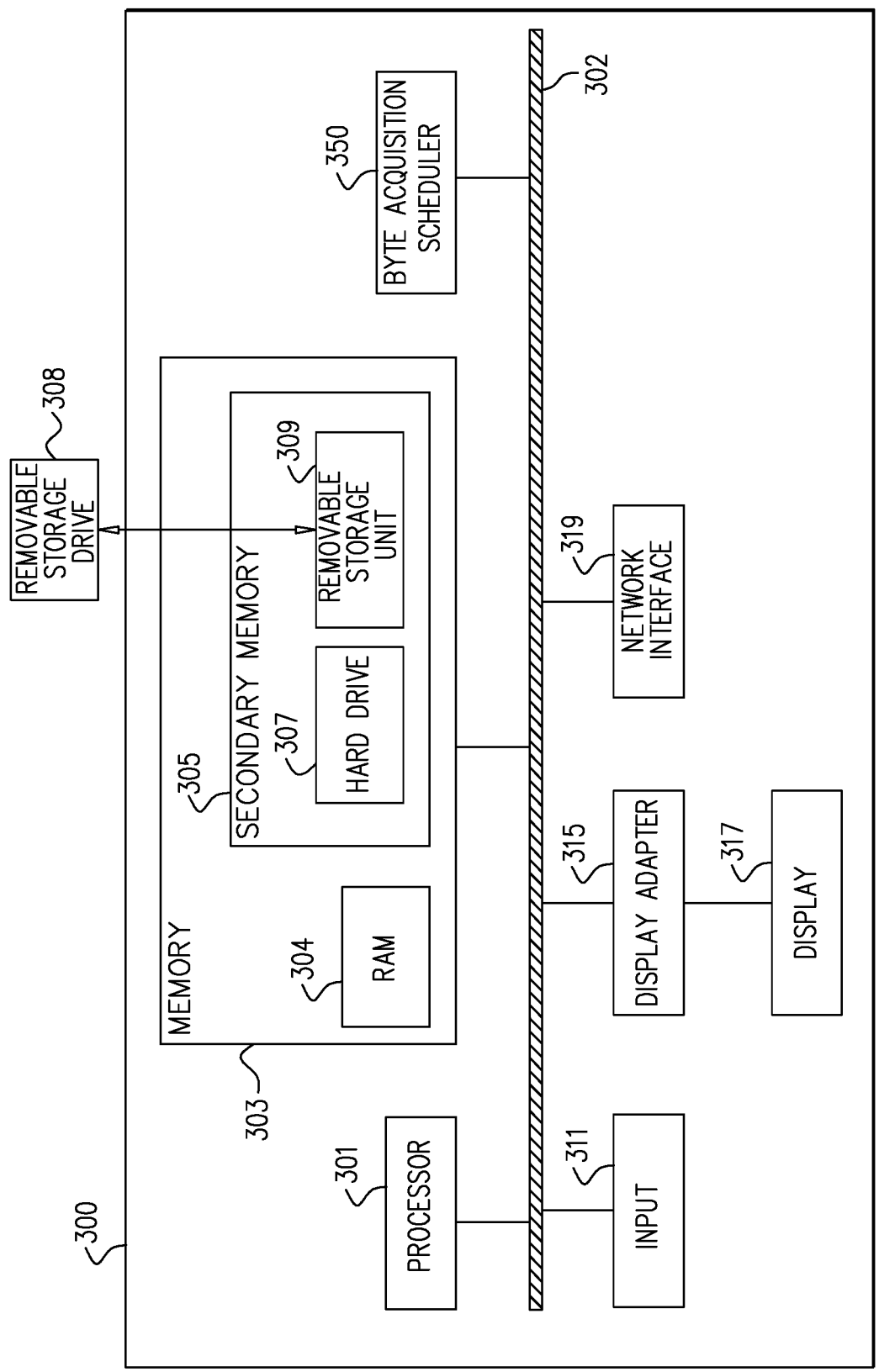
FIG. 3 is a simplified block diagram illustrating one possible embodiment of one of the client devices of FIG. 1.

Reference is now made to FIG. 3, which is a simplified block diagram illustrating one possible embodiment of one of the client devices 300 of FIG. 1. The exemplary client device 300 may be any one of the HAS clients 18a-c of FIG. 1.

The exemplary client device 300 is suitable for implementing of the systems, methods or processes described herein. The exemplary client device 300 comprises one or more processors, such as processor 301 (only one processor 301 is depicted), providing an execution platform for executing machine readable instructions such as software. The one or more processors 301 may be a special purpose processor operative to perform the method for non-real time ABR recording scheduling described herein. The one or more processors 301 comprise dedicated hardware logic circuits, in the form of an application-specific integrated circuit (ASIC), field programmable gate array (FPGA), or full-custom integrated circuit, or a combination of such devices. Alternatively, or additionally, some or all of the functions of the one or more processors 301 may be carried out by a programmable processor or digital signal processor (DSP), under the control of suitable software. This software may be downloaded to the processor in electronic form, over a network, for example. Alternatively, or additionally, the software may be stored on tangible storage media, such as optical, magnetic, or electronic memory media.

Commands and data from the one or more processors 301 are communicated to their destination over a communication bus 302. The exemplary client device 300 also includes a main memory 303, such as a Random Access Memory (RAM) 304, where machine readable instructions may reside during runtime, and a secondary memory 305. The secondary memory 305 comprises, for example, a hard disk drive 307 and/or a removable storage drive 308, such as a floppy diskette drive, a magnetic tape drive, a compact disk drive, a flash drive, etc., or a nonvolatile memory where a copy of the machine-readable instructions or software may be stored. The secondary memory 305 may also comprise ROM (read only memory), EPROM (erasable, programmable ROM), EEPROM (electrically erasable, programmable ROM). In addition to software, data such as the ABR content, data pertinent to relevant HTTP operations and methods, data pertinent to bandwidth availability, and so forth, and without limiting the generality of the foregoing, or other similar data, may be stored in the main memory 303 and/or the secondary memory 305. The removable storage drive 308 reads from and/or writes to a removable storage unit 309 in a well-known manner.

A user can interface with the exemplary device 300 via a user interface which comprises one or more input devices 311, (such as a touch screen, a keyboard, a mouse, a stylus, and the like) in order to provide user input data. A display adapter 315 interfaces with the communication bus 302 and a display 317, receives display data from the one or more processors 301, and converts the display data into display commands for the display 317.

A network interface 319 is provided for communicating with other systems and devices (external to the exemplary client device 300) via the network 16 (FIG. 1). The network interface 319 typically includes a wireless interface for communicating with wireless devices in a wireless network.

The network interface 319 may comprise a wired network interface (e.g. an Ethernet interface) present as well as the wireless network interface. The exemplary device 300 may optionally comprise other interfaces (not depicted), including, but not limited to Bluetooth, and HDMI.

The network interface 319 may be utilized by the exemplary client device 300 in order to interface with the plurality of servers 12a-b (FIG. 1) via the intermediate nodes 15a-b (FIG. 1) in order to perform ABR download of content.

It will be apparent to persons skilled in the art that one or more of the components of the exemplary device 300 may not be included in the exemplary device 300 and/or other components may be added to the exemplary device 300, as is known in the art. The exemplary device 300 shown in FIG. 3 is provided as an example of a possible platform that may be used for ABR content download, as will be explained below, and other types of platforms may be used for ABR content download as well, as is known in the art.

One or more of the steps or processes described herein may be implemented as instructions embedded on a computer readable medium and executed on the exemplary device 300. The steps or processes may be embodied by a computer program, which may exist in a variety of forms both active and inactive. For example, the steps or processes may exist as software program(s) comprised of program instructions in source code, object code, executable code or other formats for performing some of the steps. Any of the software program(s), source code, object code, executable code or other formats may be embodied on a computer readable medium, which include storage devices and signals, in compressed or uncompressed form. Examples of suitable computer readable media include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. In a sense, computer networks in general, including the Internet itself, as abstract entities, are computer readable media. The same is true of in general. It is therefore to be understood that steps or processes described herein may be performed by any electronic device capable of executing said instructions.

Service providers typically attempt to use local storage (e.g. hard disk drive 307) of devices to their advantage. These devices, such as the client device 300, may be an IP gateway, a video gateway (i.e. device 300, with or without a display 317 connected), a set top box, or other consumer electronics device with local disks (i.e. hard disk drive 307). By way of example, be one such advantage might entail creating local copies of content for later playback, in order that said content is already present on the local storage in advance of when the content is requested. When such copies are made of live content, this approach can be thought of as recording. In some circumstances, it may be appropriate to record a single representation of the content. Given varying network conditions, this may result in the recording completing in non-real time.

In an environment where the video gateway might be recording multiple live viewing sessions concurrently to multiple non-real time recordings, conflicting design concerns occur, however. On the one hand, it might be desirable to maximize network utilization order to take full advantage of the available network capacity, but on the other hand a limit of utilization of the network for sessions that have a lower priority is also desirable. One mechanism would be to throttle the lower priority streams in order to maintain capacity for the higher priority streams. However, pacing of the higher and lower priority streams may be problematic for several reasons:

Client-side pacing implies that a software stack of the exemplary client device 300 has access to a TCP socket of the network interface 319 and can control a download bandwidth. However, such a level of integration between the client device 300 and the provider (such as servers 12a-b (FIG. 1)) may not be generally available depending on the client device 300;

Server-side pacing implies ability to change software at the server (such as servers 12a-b (FIG. 1)); depending on the delivery package in use for providing the high and low priority downloads, this may not be possible;

In general, pacing of the high and low priority downloads implies that the network capacity cannot be assessed because high priority content delivery is limited to the bitrate allowed by pacing and not the full bandwidth; and If the pacing rate is too high for the overall capacity, i.e. attempting to download more the high and low priority downloads than network capacity will allow, it may not be possible to change in time to avoid underflow of one of the other sessions.

Figure 4:
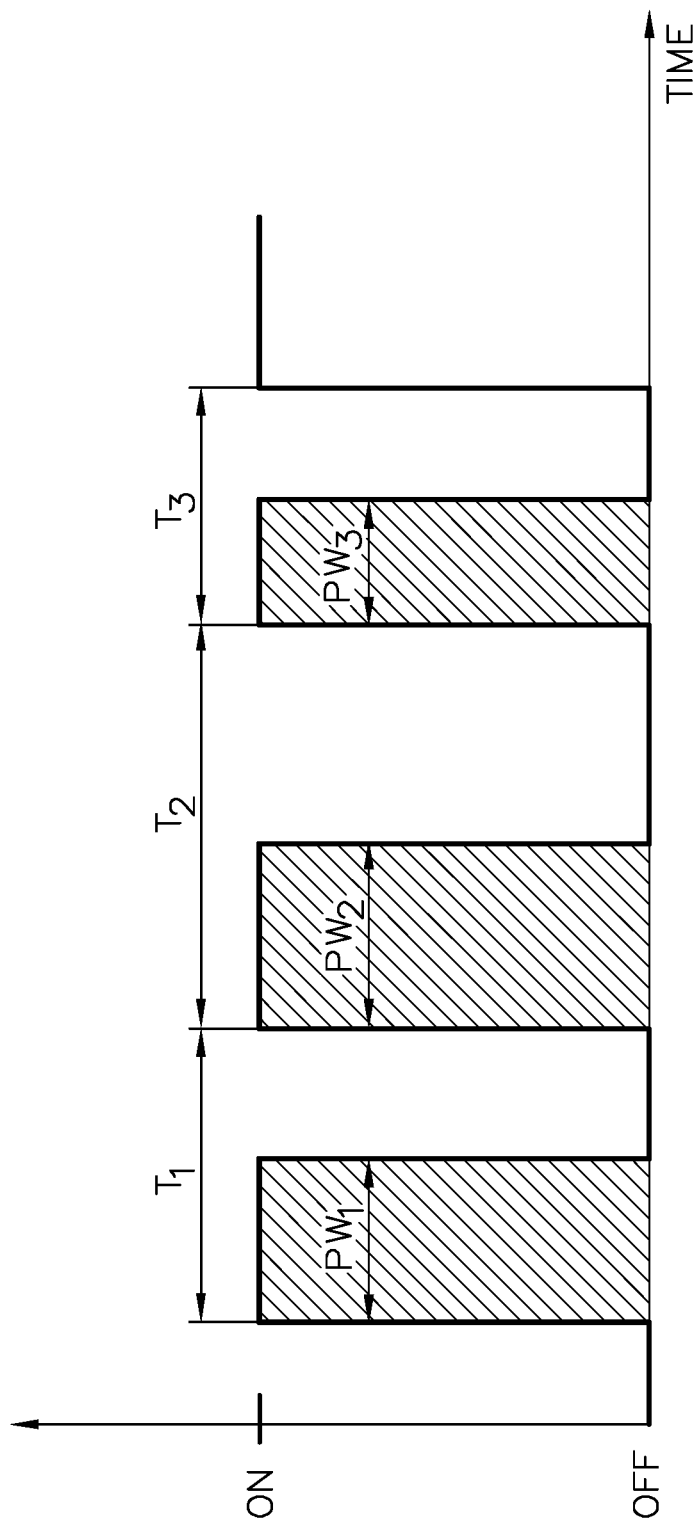
FIG. 4 is a simplified graphical representation of a network utilization scenario in the adaptive bitrate streaming environments of the embodiment of FIG. 1.

Reference is now made to FIG. 4, which is a simplified graphical representation of a network utilization scenario in the ABR streaming environments of the embodiment of FIG. 1. As persons skilled in the art will appreciated, a rectangular waveform of a certain period (T) with a pulse width (PW) has a duty cycle of PW/T. ABR streaming follows an on/off pattern such that when the ABR streaming completes a segment request (on) and then the ABR streaming pauses before making a next request (off), resulting in a rectangular waveform of network utilization. In ABR streaming, T is generally governed by a presently downloading media segment's duration. The HAS client devices 18a-c make new HTTP requests for content segment downloads based on T, in order to avoid underrun (i.e., where one or more buffer used to store downloading media segments is filled at a lower speed than the downloading media segments are being read from the buffer). PW is then governed by an amount of data to fetch and the goodput available to fetch the data. Goodput, as is known in the art is application-level throughput, measured as a number of useful information bits delivered over the network 16 (FIG. 1) to a certain destination (i.e., one of the HAS client devices 18a-c) per unit of time, excluding protocol overhead bits and retransmitted data packets. Goodput is typically highly variable and the system reacts to rapid changes of goodput, due to, for example, fluctuations in network conditions, and so forth. The duty cycle of the media content download system is effectively a ratio of media encoding rate to goodput.

T can safely be varied to change overall network utilization in a non-real time (i.e., low priority) recording scenario, as it is typically the case that underrun is only a minor concern, if of any concern at all, due to the non-real time nature of the scenario. However, the PW will continue to be governed by the ratio of media encoding rate to goodput. Accordingly, in FIG. 4, $T_2$ is larger than $T_1$, which itself is somewhat larger than $T_3$ in order to show that T may be varied.

Competing sessions, i.e., sessions which are downloading at the same time, and are competing for the same bandwidth, can be broadly classified as either:

High priority—i.e., sessions that must complete in time to avoid underrun; and

Low priority—i.e., sessions that are driven by a much longer deadline, and accordingly, do not necessarily require real time download.

Furthermore, it may be desirable that the non-real time (i.e., low priority) sessions complete at a fixed quality (preferably a highest available quality), but if possible, it may also be preferable to avoid adaptation (i.e. a reduction in quality) if possible for live (i.e., high priority) sessions. In that TCP does not divide bandwidth in any non-equal fashion, without changing T and PW of these competing high and low priority sessions, TCP would attempt to be fair and share the available network capacity between the sessions. For example, a 20 Mb/s link used by one session for segment durations of 4 s and an encoding rate of 5 Mb/s would yield T=4 and PW=1 (i.e. duty cycle of 25%). That same scenario with 2 sessions would have PW increase from 1 to 2 for each session, and in that case, each session would observe transfers of 10 Mb/s (assuming that TCP is fair, as noted above). At full utilization with 4 sessions, each session would observe 5 Mb/s during the PW. Extending this example, consider the case where 2 sessions are high priority (2H) and 3 sessions are low priority (3L). With fair-share, it would not be possible to sustain the high priority sessions at 5 Mb/s, because the available bandwidth (i.e., fair-share) would drop to 4 Mb/s.

A byte acquisition scheduler disposed in the HAS client 18a-c (FIG. 1) may be operative to manage the waveform of the low priority sessions so that the goodput measured over the course of the PW for the high priority sessions has the potential to remain high enough to sustain the desired quality. The byte acquisition scheduler 350 (FIG. 3) can utilize an HTTP range request, whereby, bytes of an HTTP packet (such as a segment of the ABR content item) are requested from the server (such as plurality of servers 12a-b, FIG. 1) within a particular byte offset from the start of the HTTP packet. That is to say that the byte acquisition scheduler 350 (FIG. 3) can break the segments of low priority sessions into segments of smaller HTTP byte ranges (i.e. segments having smaller segment length) so that their T and PW can be varied independently of those of the high priority sessions. Further, the byte acquisition scheduler 350 (FIG. 3) is operative to manage the overall network utilization across the sessions and to divide and allocate total network capacity between sessions according to priority. The functioning of the byte acquisition scheduler 350 (FIG. 3) will be discussed below, following the discussion of FIG. 10.

Accordingly, the shape of the waveform of a low priority session is calculated based on the requirements of the high priority sessions. Returning to the 2H+3L scenario, each high priority session requires at least an average of 5 Mb/s across its PW or else the high priority session may shift downwards to a lower bandwidth session. Accordingly, an average of 10 Mb/s is provided for the two high priority sessions to maintain their average 5 Mb/s.

Since each of the high priority sessions is to be provided with an average 5 Mb/s, each low priority session does not request more than an average of 3.3 Mb/s over the duration of the PW of any high priority session. The byte acquisition scheduler 350 (FIG. 3) accordingly breaks the segments of the three lower priority sessions into smaller HTTP byte ranges so while the duty cycle is still derived by spare capacity, the period, and hence PW of each sub-request is reduced accordingly.

Figure 5:
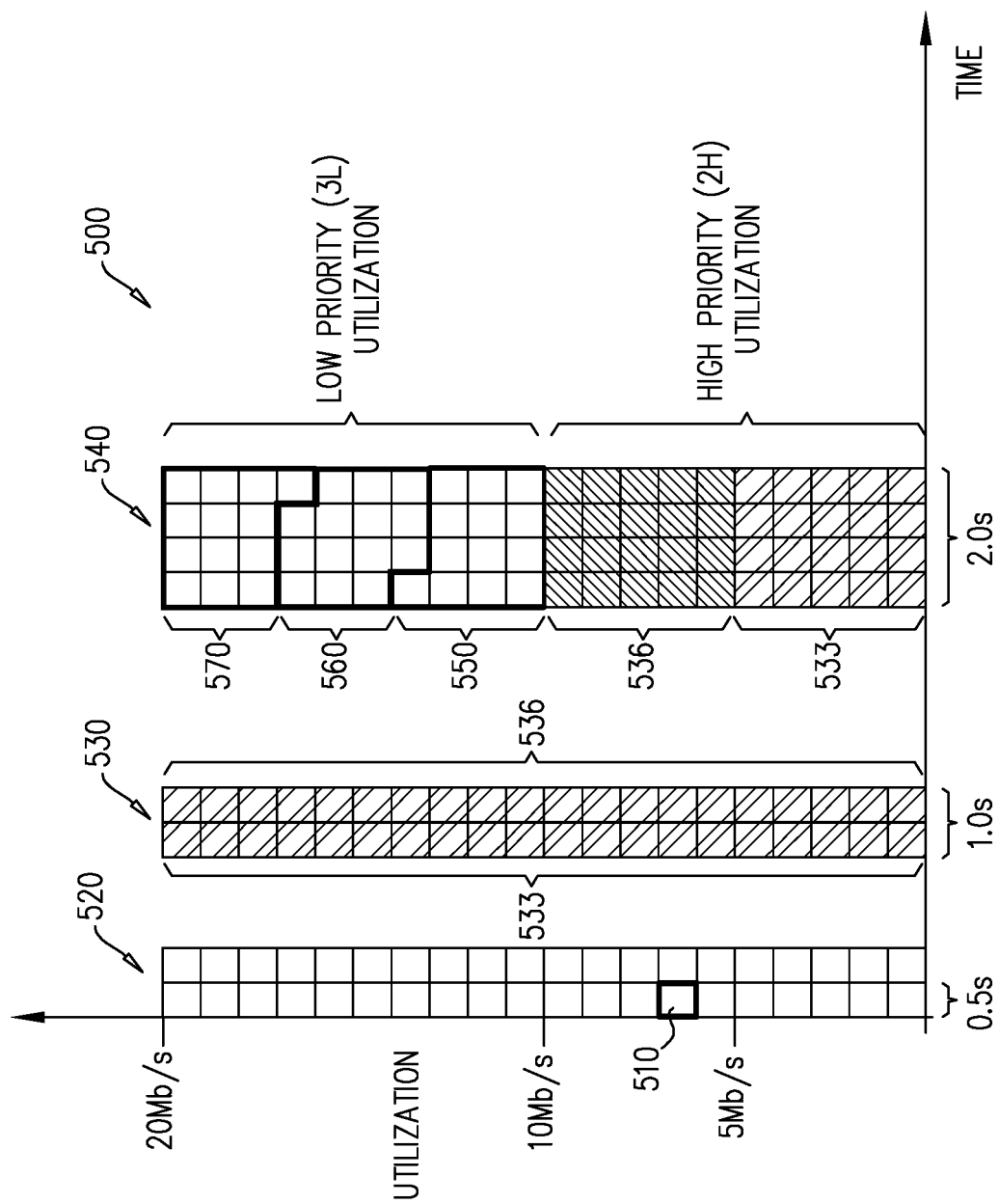
FIG. 5 is an exemplary graphical representation of bandwidth utilization over time for a 20 Mb/s connection for downloading various amounts of content in embodiments of the adaptive bitrate streaming environments of FIG. 1.

Reference is now made to FIG. 5, which is an exemplary graphical representation 500 of a 20 Mb/s connection for downloading various amounts of content in embodiments of the adaptive bitrate streaming environments of FIG. 1. A 20 Mb/s link may be thought of, by way of illustration, as a pipe of data which can fit 40 "blocks" representing 0.5 Mb of data every second, such as block 510 (i.e. 20 Mb/s link). A first set of blocks 520 can be thought of as showing a single download at the full bandwidth of 20 Mb/s—20 blocks in a first half second and 20 blocks in a second half second. A second set of blocks 530 can be thought of as showing the two 2H high priority downloads 533, 536 described above—each one receiving 10 Mb/s.

A third set of blocks 540 can be thought of as providing, over a two second time span, each of the two 2H high priority downloads 533, 536 with its 10 Mb/s (i.e. 0.5 Mb/s per block*20 blocks/2 s=10 Mb/s). The remaining 40 blocks, are, accordingly divided into three groups of blocks 550, 560, 570. Each one of the three groups of blocks 550, 560, 570 is therefore allocated a "fair-share" ($\frac{1}{3}^{rd}$) of the remaining 10 Mb/s, or, on average, 3.33 Mb/s. (It is appreciated that group of blocks 550 and 570 are both depicted as having 13 blocks, and group of blocks 560 is depicted as having 14 blocks. This is due to rounding effects, and may be viewed as a result of local unequal distribution which is accounted for, on average, over longer amounts of time.

To rephrase the above discussion somewhat, a single 40 Mb low priority session may be broken down, for example, into a number of smaller download requests, each one of which may be allocated a smaller bandwidth. So, two requests are allocated 3.25 Mb/s, as is seen in groups of blocks 550 and 570. One request is allocated 3.5 Mb/s, as is seen in groups of blocks 560.

Using techniques know in the art, the scheduler can constantly probe the average utilization upwards by reducing the inter-request gap. Alternatively, increasing the inter-request gap has the effect of reducing the average utilization. The average utilization can be capped by resource availability if desired.

The above described embodiment illustrates how the byte acquisition scheduler 350 (FIG. 3) may equally divide available bandwidth between two high priority downloads (i.e., the two 2H high priority downloads 533, 536 described above—each one is described as receiving 10 Mb/s). In some embodiments, priorities may be more complex than just high and low. In general, the shape of a particular session's network utilization waveform is derived by the requirements of the session(s) of next highest priority. In general, it is not always necessary to subdivide byte ranges of each layer of priority beneath the highest two layers of priority, as sessions of lower priority can be managed by their inter-request delay alone if appropriate. By way of example, program P1 is live, and is presently receiving the highest slice of bandwidth, e.g. 10 Mb/s, out of 20 Mb/s. A second program P2 may be of intermediate importance, for example, P2 will be live as soon as P1 ends. Finally, P3 is not slated to begin any time soon, and as such has the lowest priority of these three programs, P1, P2, and P3. In some embodiments, the remaining 10 Mb/s, out of 20 Mb/s may be divided up so that P2 gets 6.7 Mb/s, and P3 gets the remaining 3.3 Mb/s. This unequal allocation by the byte acquisition scheduler 350 (FIG. 3) can be achieved by varying the inter-request delay between the pieces, so that a larger delay is provided for lower priority downloads.

Figure 6:
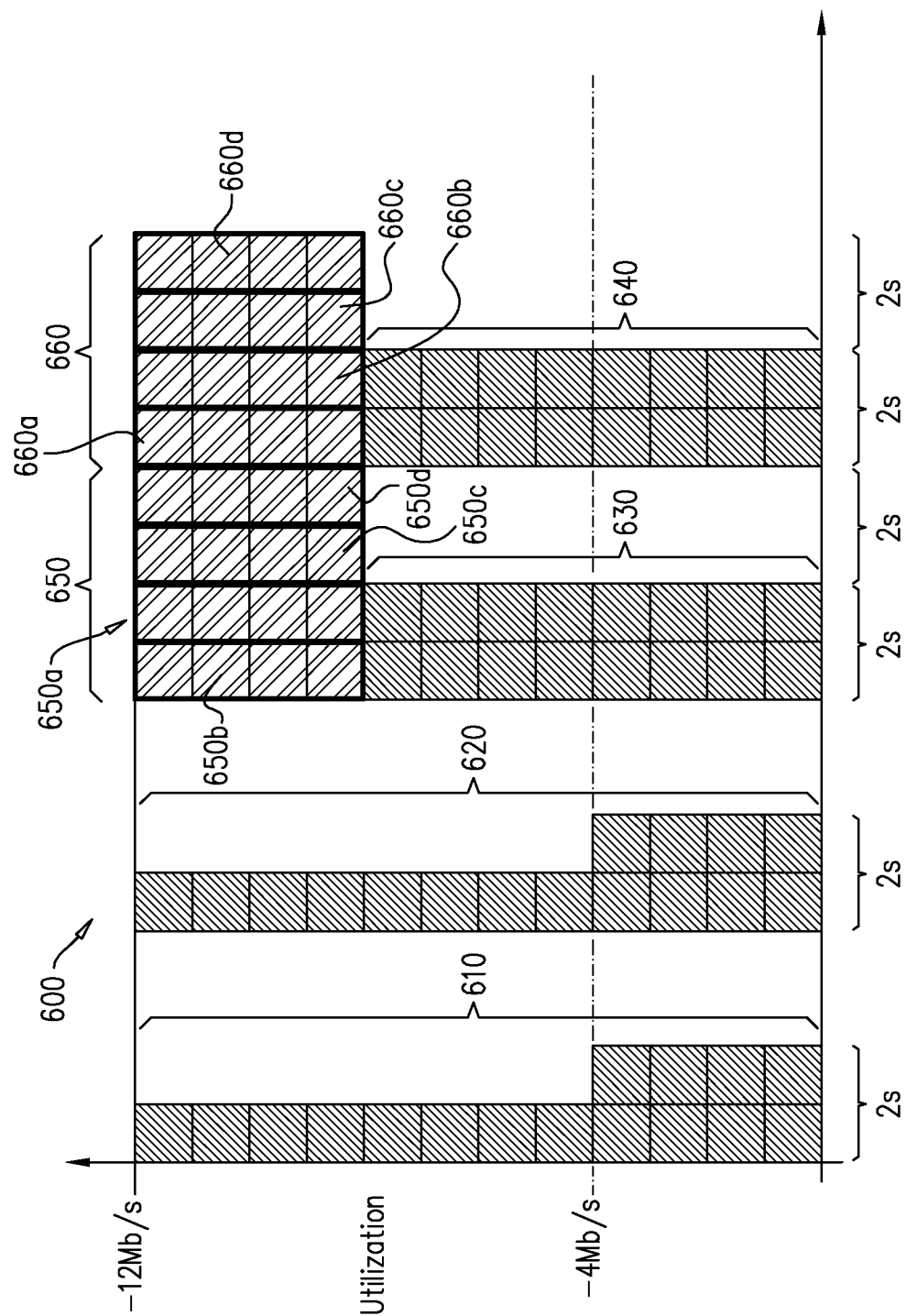
FIG. 6 is another graphical representation of bandwidth utilization over time for downloading various amounts of content in embodiments of the adaptive bitrate streaming environments of FIG. 1.

Reference is now made to FIG. 6, which is another graphical example 600 of a method for downloading various amounts of content in embodiments of the adaptive bitrate streaming environments of FIG. 1. FIG. 6 depicts another embodiment of the adaptive bitrate streaming environments of FIG. 1, wherein the total available bandwidth for downloading content is 12 Mb/s. Each block in the graphical example 600 represents 1.0 Mb of data every second.

With the 12 Mb/s bandwidth, a playback session is able to download high priority segments 610 and 620 in the allotted 1 second, as depicted. High priority segments 630 and 640 are also able to download in the allotted 1 second, even as a lower priority download begins, splitting its transfer into 4 segments 650a-d and 660a-d. Each of the lower priority segments 650a-d and 660a-d downloads at an effective throughput of 8 Mb/s, which is enough to achieve an effective recording rate of 1× for the lower priority download.

Figure 7:
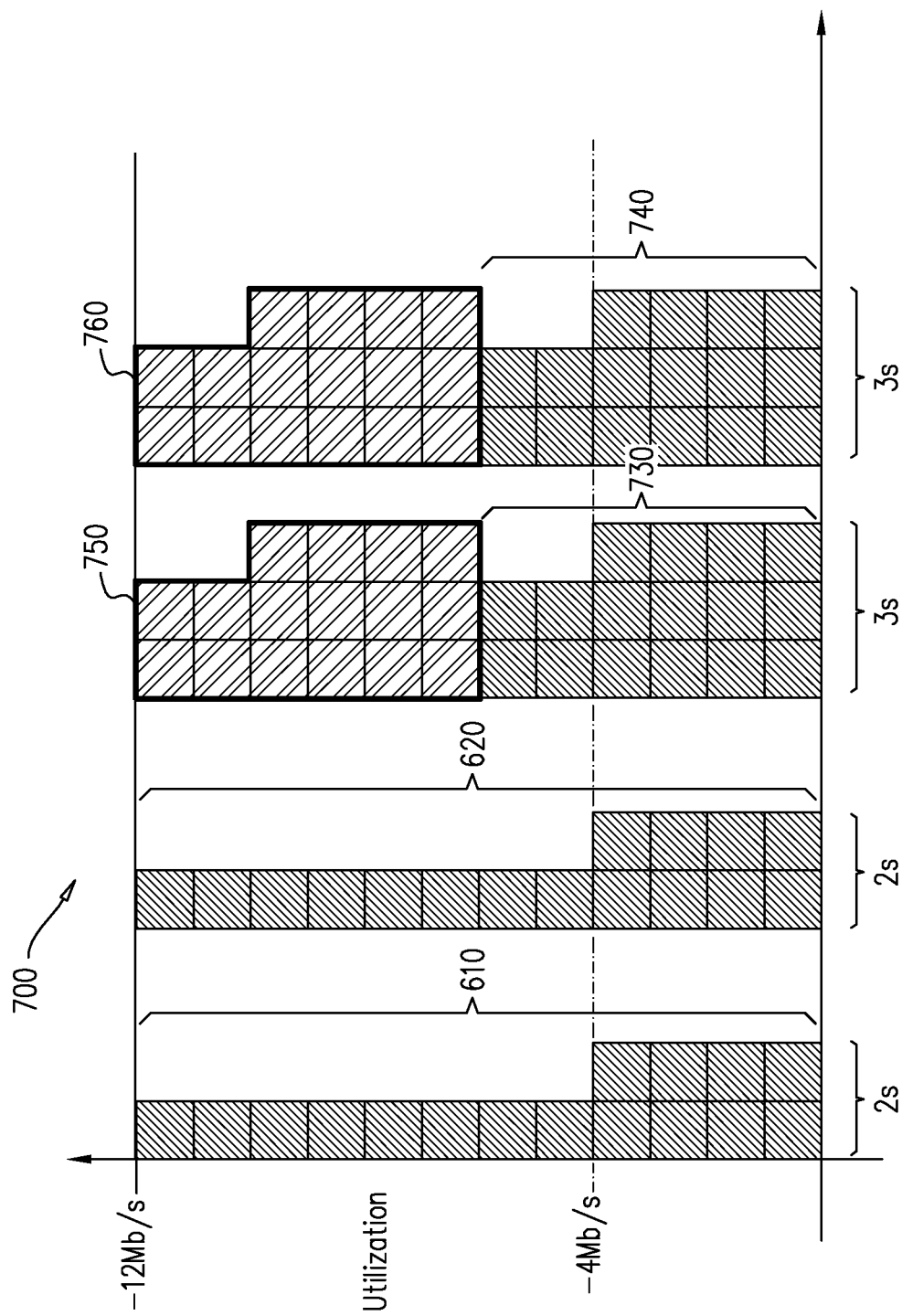
FIG. 7 is still another graphical representation of bandwidth utilization over time downloading various amounts of content in embodiments of the adaptive bitrate streaming environments of FIG. 1.

Reference is now made to FIG. 7, which is still another graphical example of a method of for downloading various amounts of content in embodiments of the adaptive bitrate streaming environments of FIG. 1.

FIG. 7 is a second embodiment of the scenario depicted in FIG. 6. However, in the embodiment depicted in FIG. 7, instead of the download session of high priority segments 630 (FIG. 6), a download session of high priority segments 730 is depicted, High priority segments 730 are downloading at 6 Mb/s, in parallel with low priority download segments 750. Low priority download segments 750 correspond to lower priority segments 650a-d of FIG. 6. However, in the embodiment depicted in FIG. 7, low priority download segments 750 are downloading at 6 Mb/s, i.e. the same download bandwidth as high priority download segments 730. The same is true for high priority download segments 740 and low priority download segments 760.

Figure 8:
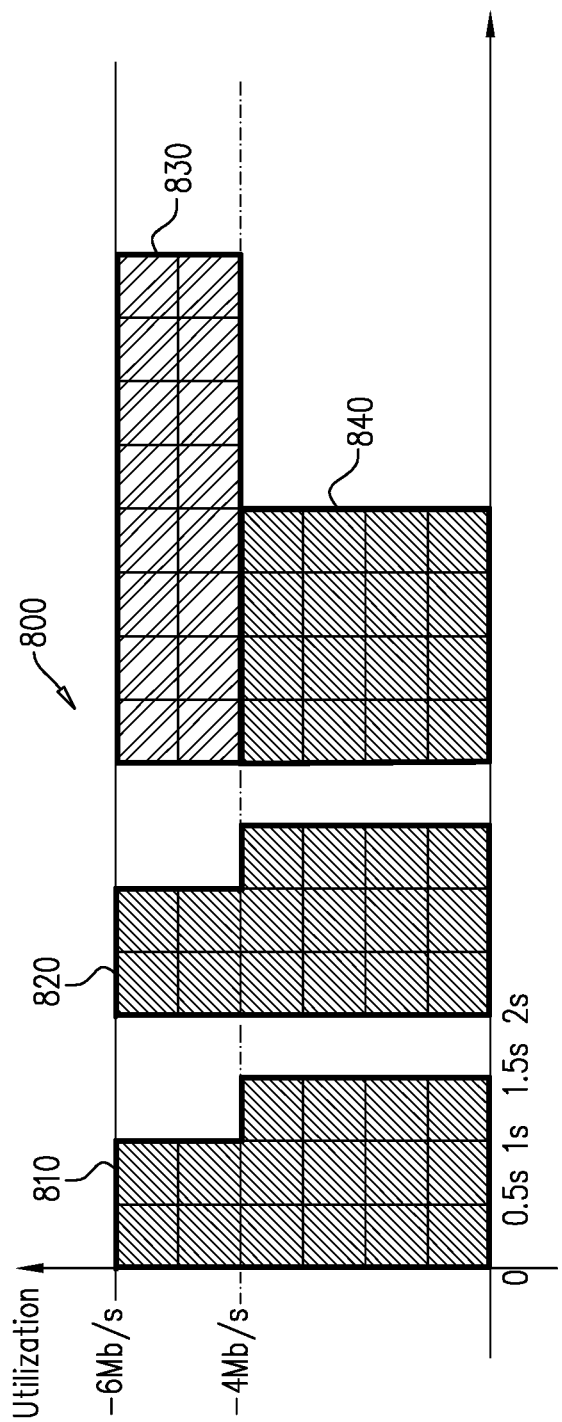
FIGS. 8-10, taken together, are yet another graphical representation of bandwidth utilization over time for downloading various amounts of content in embodiments of the adaptive bitrate streaming environments of FIG. 1.
Figure 9:
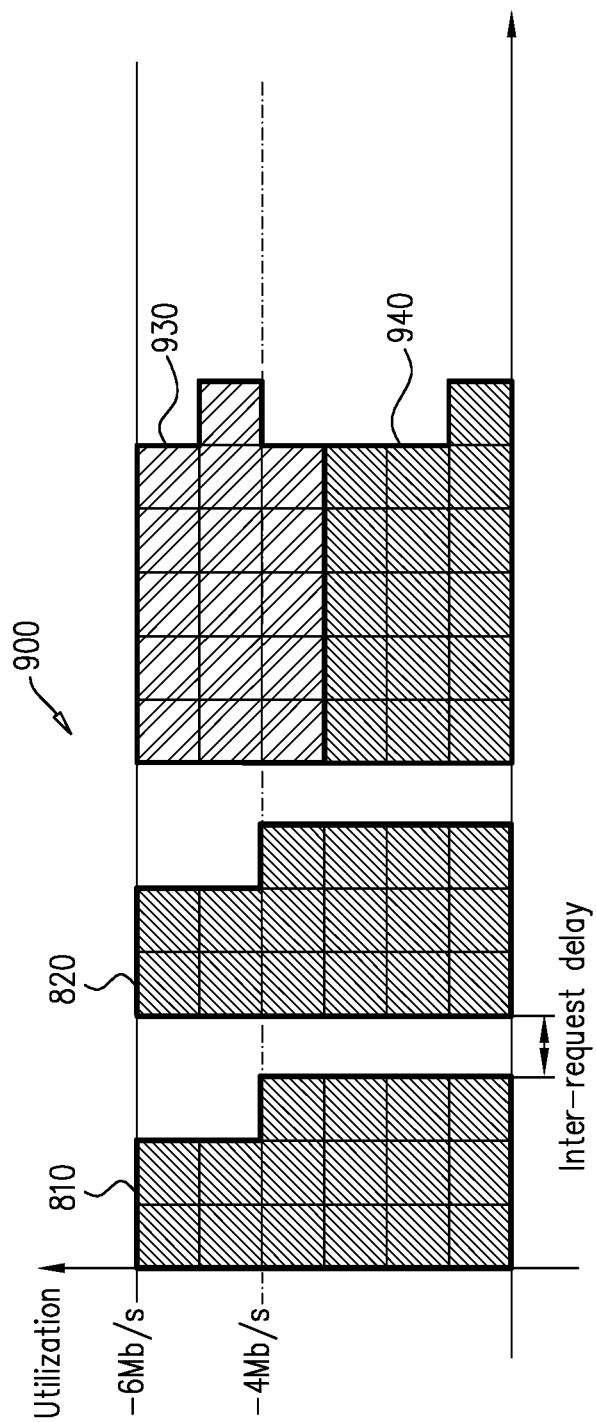
Figure 10:
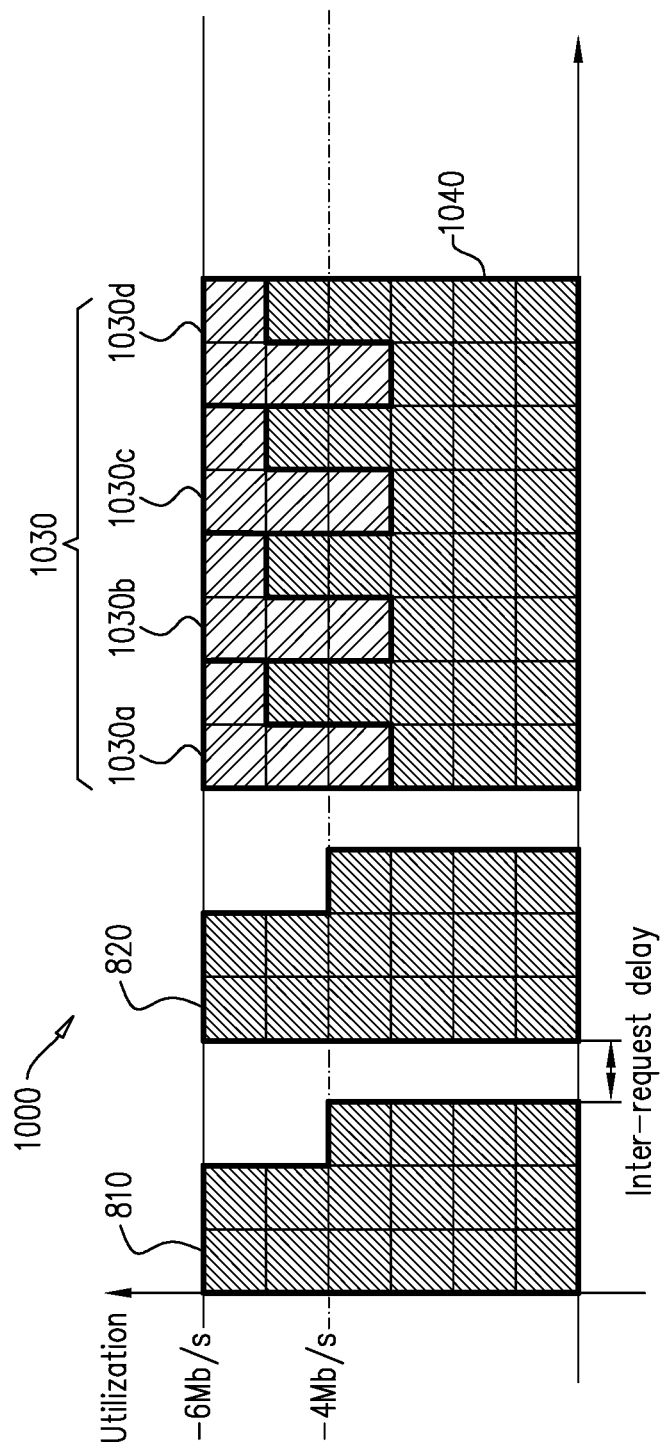

Reference is now made to FIGS. 8-10, which, taken together, are yet another graphical example of a method of for downloading various amounts of content in embodiments of the adaptive bitrate streaming environments of FIG. 1. FIGS. 8-10 depict an aggressive scenario with a download bandwidth of 6 Mb/s. Content being downloaded for viewing has a 4 Mb/s encoding rate. Each block in FIGS. 8-10 represents a 0.5 Mb block of data out of a two second segment. That is to say, there are 16 such blocks per segment. Turning specifically to the graphical example 800 depicted in FIG. 8, segments 810 and 820 depicts a download of the two second segment described above, utilizing the available bandwidth.

After segment 820 has been downloaded, a recording session, to downloaded concurrently with the viewing session begins. The recording session is depicted as segment 830. The viewing session, depicted now as segment 840, is presently allocated the 4 Mb/s the viewing session requires in order to not have to adapt to a lower bitrate session. The recording session, i.e. segment 830, is accordingly allocated the remaining bandwidth, i.e. 2 Mb/s.

Referring specifically to FIG. 9 now, a graphical example 900 depicts a scenario where TCP shares bandwidth equally between the recording session, now depicted as recording session 930, and the viewing session, now depicted as viewing session 940. In the graphical example 900, the recording session 930 receives half of the available 6 Mb/s, so that the recording session 930 proceeds at 3 Mb/S. However, the viewing session 940 also receives half of the available 6 Mb/s, so that the viewing session 940 is downloading at 3 Mb/s (like the recording session 930). However, as noted above, the viewing session is encoded for viewing at 4 Mb/s, and so, the viewing session 940 would be expected to adapt to a lower encoding rate of 3 Mb/s or less, depending on what is available for download.

Turning now to FIG. 10, a graphical example 1000 depicts a scenario where the byte acquisition scheduler 350 (FIG. 3) splits the recording session (now recording session 1030) into four parts 1030a-d. The byte acquisition scheduler 350 (FIG. 3) also inserts a suitable inter-request delay, i.e., the "off" portion of the wave form described above in the discussion of FIG. 4. This enables an effective reduction of the duty cycle of the sessions, such as recording session 930 and viewing session 940 of FIG. 9. However, concurrently with the effective reduction of the duty cycle, bandwidth utilization is actually higher than for the recording session 930 and the viewing session 940 of FIG. 9. Note that the effective throughput in the viewing session 1040 remains at 4 Mb/s.

FIGS. 9 and 10 show an inter-request delay. The inter-request delay corresponds to the off period of the duty cycle.

Figure 11A:
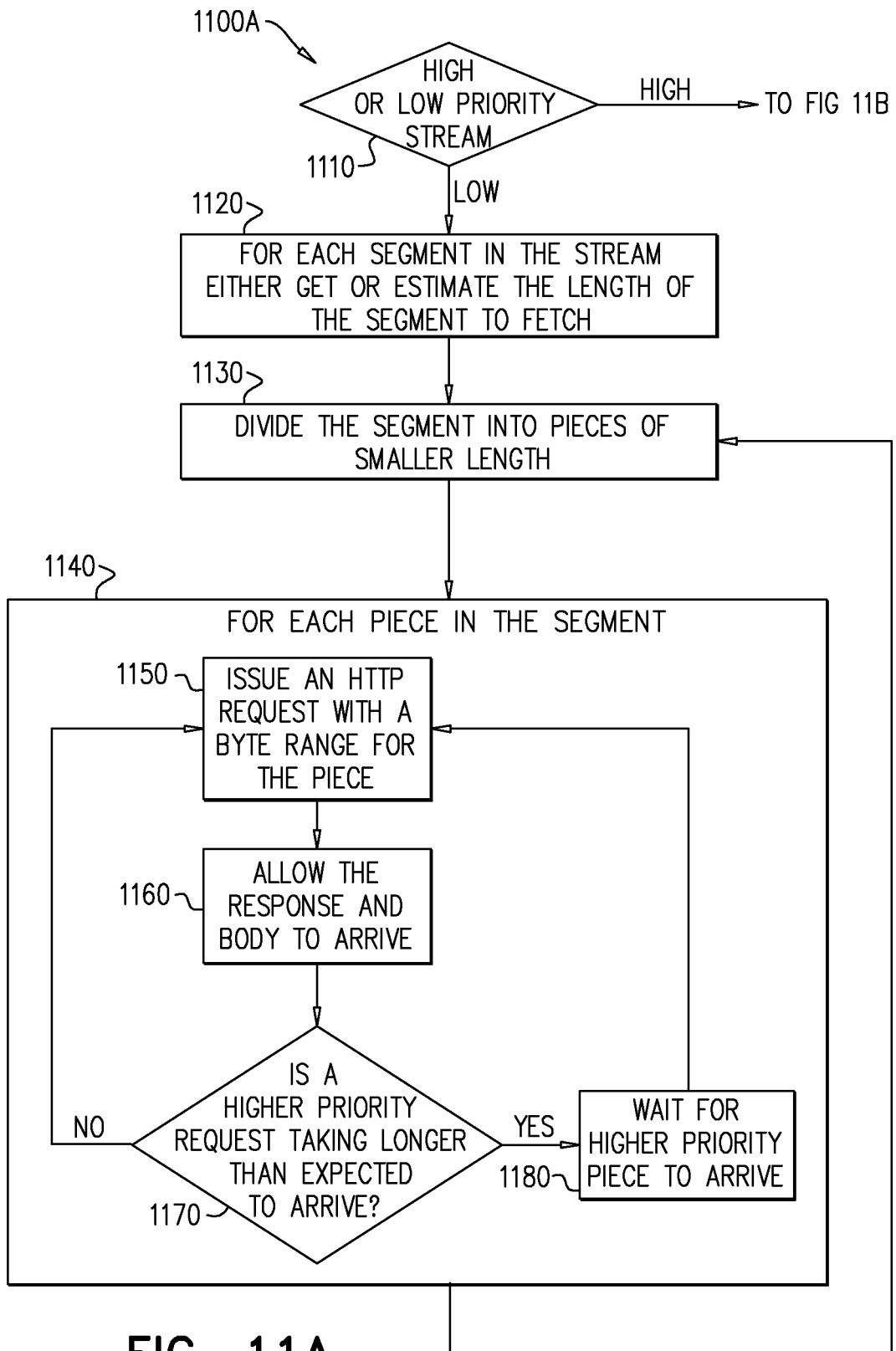
FIGS. 11A and 11B are flow charts of a method of operation of an embodiment of the byte acquisition scheduler of FIG. 3.
Figure 11B:
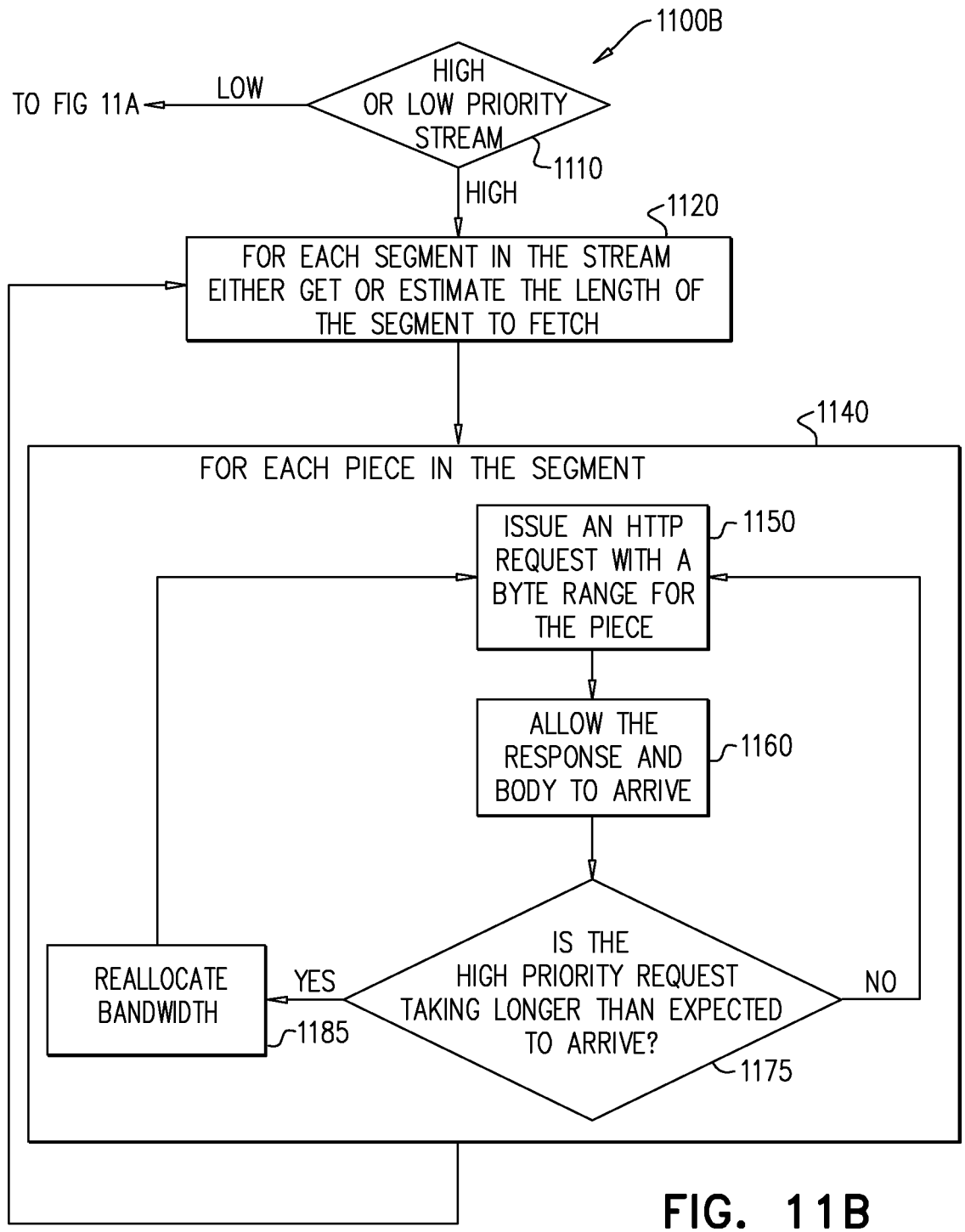

Reference is now made to FIGS. 11A and 11B, which are flow charts 1100A and 1100B of a method of operation of an embodiment of the byte acquisition scheduler 350 (FIG. 3). At a first stage 1110, the byte acquisition scheduler 350 (FIG. 3) determines if the stream is a high priority stream, or if the stream is a low priority stream. The implementation of the byte acquisition scheduler 350 (FIG. 3) for a high priority stream will be discussed below with reference to FIG. 11B. Turning specifically to FIG. 11A, if the stream is determined to be a low priority stream by the byte acquisition scheduler 350 (FIG. 3), then for each segment in the stream, the byte acquisition scheduler 350 (FIG. 3) will either get the length of the segment or estimate the length of the segment, as is explained immediately below (step 1120).

Returning briefly and additionally to the discussion of the byte acquisition scheduler 350 (FIG. 3), with additional reference made to the examples provided in FIGS. 5-10, for a first byte range request, the byte acquisition scheduler 350 can either issue an HTTP HEAD request in order to get an actual content-length, or, the byte acquisition scheduler 350 (FIG. 3) estimate actual content-length based on the encoding rate advertised in the ABR protocol and the expected segment duration. Persons skilled in the art will appreciate that the HTTP HEAD request is similar to the HTTP GET request, except that, in response to a HTTP HEAD request, the server may not return a message-body in response. It is typically the case that the response to the HTTP HEAD request will provide the content length. Accordingly, division of the entire content segment into equal ranges may be precise. Since the byte acquisition scheduler 350 (FIG. 3) functions, at least in part, as a byte fetching scheduler, accuracy may be important when operating at peak load. On the other hand, the use of the HTTP HEAD request involves insertion of an additional client-server-client round-trip when an estimate based on encoding rate and the expected segment duration may be adequate (step 1130).

The byte acquisition scheduler 350 (FIG. 3) may issue subsequent range requests based on the length provided in the first response for the first segment. Initial session utilization can be based upon any or all of: a known deadline for recording to complete; an estimate of capacity remaining after determining, by the byte acquisition scheduler 350 (FIG. 3), utilization of higher priority sessions and observed overall capacity; and a configurable starting utilization value.

For each piece in the segment (step 1140):
An HTTP request to get the piece is issued, the HTTP request including a byte range for the piece. The byte range is determined by the method described above either by estimating the length of the segment (and hence the pieces of the segment), or on the basis of the result of the HTTP HEAD request (step 1150).

At step 1160, the byte acquisition scheduler 350 (FIG. 3) allows a response to the HTTP request and the body of the piece of ABR streamed content to arrive.

Once the response to the HTTP request and the body of the piece of ABR streamed content arrive, the byte acquisition scheduler 350 (FIG. 3) determines if, the HTTP request and body of the piece of a higher priority content item is taking longer to arrive than expected (step 1170).

If there was no piece of higher priority content for which the byte acquisition scheduler 350 (FIG. 3) is waiting, then control is returned to step 1150, and so forth, until the pieces of the segment have completed downloading.

However, if there is a piece of higher priority content for which the byte acquisition scheduler 350 (FIG. 3) is waiting, then the byte acquisition scheduler 350 (FIG. 3) pauses (step 1180) until the higher priority piece of content arrives. Then, then control is returned to step 1150, and so forth, until the pieces of the segment have completed downloading.

After the pieces in the segment have downloaded, control is returned to step 1130, for the next segment to download, and so forth, until the segments in the stream have completed downloading or acquisition is stopped.

Turning now to FIG. 11B, as with FIG. 11A, the first stage 1110, the byte acquisition scheduler 350 (FIG. 3) determines if the stream is a high priority stream, or if the stream is a low priority stream. If the stream is a high priority stream, then steps 1120 and 1140-1160 are performed, as described above (step 1130, dividing the segment into pieces of smaller length, is not necessary or desirable for high priority content). However, because the stream being downloaded in flowchart 1100B is now the high priority stream, if at step 1175 the byte acquisition scheduler 350 (FIG. 3) determines that the requested high priority stream is taking longer to download than expected by the byte acquisition scheduler 350 (FIG. 3), the byte acquisition scheduler 350 (FIG. 3) will reallocate bandwidth, as described herein above, so that high priority requests arrive in a timely fashion (step 1185). Control is then returned to step 1150, and eventually to step 1130, as described above.

It is appreciated in the description of FIGS. 11A and 11B that in general, the ABR streams and requests download and operate in parallel. However, the byte acquisition scheduler 350 (FIG. 3) will delay downloading lower priority stream (such as at step 1180) when there is a delay in the arrival of higher priority streams.

In some embodiments, if the HAS client (for example, HAS client 18a of FIG. 1) has some information of a target utilization of bandwidth for lower priority streams, then the delaying step 1180 can be replaced with a pause, rather than interrupting the download of the lower priority item until the download of the lower priority item may be continued. The duration of such a pause would directly related to a number of bytes to be requested next and an observed rate of transfer of the previously downloaded piece.

Utilization may probe downwards as needed in response to actual network conditions as allowed by inserting delay which increases the inter-request gap, or, alternatively, requests can be deferred by the byte acquisition scheduler 350 (FIG. 3) if insufficient capacity is observed to sustain higher priority sessions.

In some embodiments, a transition may occur, wherein, for whatever reason, a high priority download becomes a low priority download, or alternatively, a low priority download becomes a high priority download. By way of example, if a program which is presently being view live is now switched, so that, for whatever reason, the remainder of the program is to be recorded, then the byte acquisition scheduler 350 (FIG. 3) may lower the bandwidth allocation of the formerly-high priority download. Alternatively, if a program which was being downloaded in a low priority fashion is now switched to live viewing, the segments which are now to be downloaded for this program would now be subjected to high priority download scheduling.

Figure 12:
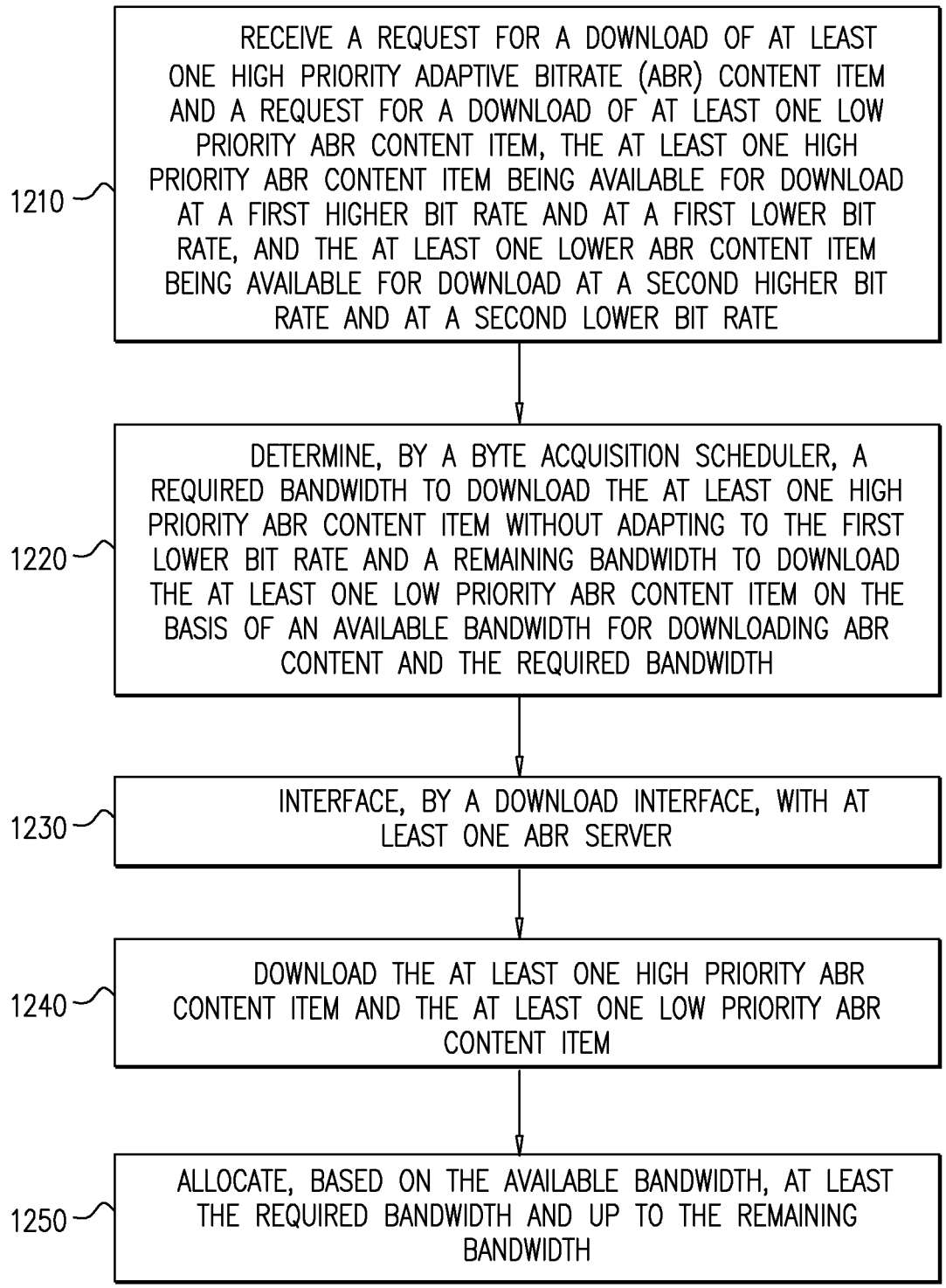
FIG. 12 is a flow chart of a method of operation of an embodiment of the system of FIG. 1.

Reference is now made to FIG. 12, which is a flow chart of a method of operation an embodiment of the system of FIG. 1. At step 1210, a request for a download of at least one high priority ABR content item and a request for a download of at least one low priority ABR content item is received at a processor, such as the one or more processors 301 of FIG. 3. The at least one high priority ABR content item is available for download at a first higher bit rate and at a first lower bit rate, and the at least one lower ABR content item is available for download at a second higher bit rate and at a second lower bit rate.

The byte acquisition scheduler 350 (FIG. 3) determines a required bandwidth to download the at least one high priority ABR content item without adapting to the first lower bit rate and a remaining bandwidth to download the at least one low priority ABR content item on the basis of an available bandwidth for downloading ABR content and the required bandwidth (step 1220).

At step 1230 a download interface, such as network interface 319 of FIG. 3, interfaces with at least one ABR server, such as server 12a of FIG. 1. The download interface then downloads the high priority ABR content item and the low priority ABR content item (step 1240). The download interface allocates at least the required bandwidth and up to the remaining bandwidth, on the basis of the available bandwidth (step 1250).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system comprising:
    a memory storage; and
    a processing unit coupled to the memory storage, wherein the processing unit is operative to:
        receive a request for a download of at least one high priority adaptive bitrate (ABR) content item that must be downloaded in time to avoid underrun and a request for a download of at least one low priority ABR content item that does not require a real time download, the at least one high priority ABR content item being available for download at a first higher bit rate and at a first lower bit rate, and the at least one lower ABR content item being available for download at a second higher bit rate and at a second lower bit rate;

determine a required bandwidth to download the at least one high priority ABR content item without adapting to the first lower bit rate;

determine a remaining bandwidth to download the at least one low priority ABR content item on the basis of an available bandwidth for downloading ABR content and the required bandwidth;

download the at least one high priority ABR content item and the at least one low priority ABR content item, wherein the processing unit being operative to download the at least one low priority ABR content item comprises the processing unit being operative to:

determine a new segment size of the at least one low priority ABR content item which is of a smaller time length than an originally determined segment time length of the at least one low priority ABR content item and download the new segment size, request the at least one low priority ABR content item within a byte offset from a start of the originally determined segment, and insert a predetermined time gap between requests for the at least one low priority ABR content item;

allocate, based on the available bandwidth, at least the required bandwidth and up to the remaining bandwidth;

reallocate, upon a drop occurring in the available bandwidth, the remaining bandwidth resulting from the drop in available bandwidth, based on the new segment size; and unequally allocate the remaining bandwidth among at least two low priority ABR content items upon receipt of requests for download of at the least two low priority ABR content items.

2. The system according to claim 1 wherein the processing unit is operative to equally allocate the remaining bandwidth among at least two low priority ABR content items upon receipt of requests for download of the at least two low priority ABR content items.

3. The system according to claim 1 wherein the processing unit is operative to allocate the required bandwidth equally among at least two high priority ABR content items upon receipt of requests for download of the at least two high priority ABR content items.

4. The system according to claim 1 wherein the processing unit is operative to reallocate the remaining bandwidth when a content item being downloaded as a high priority ABR content item download transitions to a low priority ABR content item.

5. The system according to claim 1 wherein the processing unit is operative to reallocate the remaining bandwidth when a content item being downloaded as a low priority ABR content download transitions to a high priority ABR content item.

6. The system according to claim 1 wherein the processing unit is operative to defer downloading of a next segment of the at least one low priority ABR content item by the download interface upon completion of a download of a segment of the at least one low priority ABR content item if a segment of the at least one high priority ABR content item is not yet complete.

7. A method comprising:

receiving a request for a download of at least one high priority adaptive bitrate (ABR) content item that must be downloaded in time to avoid underrun and a request for a download of at least one low priority ABR content item that does not require a real time download, the at least one high priority ABR content item being available for download at a first higher bit rate and at a first lower bit rate, and the at least one lower ABR content item being available for download at a second higher bit rate and at a second lower bit rate;

determining a required bandwidth to download the at least one high priority ABR content item without adapting to the first lower bit rate and a remaining bandwidth to download the at least one low priority ABR content item on the basis of an available bandwidth for downloading ABR content and the required bandwidth;

downloading the at least one high priority ABR content item and the at least one low priority ABR content item, wherein downloading the at least one low priority ABR content comprises:

determining a new segment size of the at least one low priority ABR content item which is smaller segment length than an originally determined segment length of the at least one low priority ABR content item based on the available bandwidth of for downloading the at least one low priority ABR, requesting the at least one low priority ABR content item within a byte offset from a start of the originally determined segment, and waiting for a predetermined time before requesting a next segment of the at least one low priority ABR content item;

allocating, based on the available bandwidth, at least the required bandwidth and up to the remaining bandwidth;

reallocating, upon a drop occurring in the available bandwidth, the remaining bandwidth resulting from the drop in available bandwidth, based on the new segment size; and upon receipt of requests for download of at least two low priority ABR content items, unequally allocating the remaining bandwidth among the at least two low priority ABR content items.

8. The method according to claim 7, wherein, upon receipt of requests for download of at least two low priority ABR content items equally allocating the remaining bandwidth among the at least two low priority ABR content items.

9. The method according to claim 7, wherein, upon receipt of requests for download of at least two high priority ABR content items, equally allocating the required bandwidth among the at least two high priority ABR content items.

10. The method according to claim 7, further comprising reallocating the remaining bandwidth when a content item being downloaded as a high priority ABR content item download transitions to a low priority content item.

11. The method according to claim 7, further comprising reallocating the remaining bandwidth when a content item being downloaded as a low priority ABR content download transitions to a high priority content item.

12. The method according to claim 7, wherein, upon completion of a download of a segment of the at least one low priority ABR content item, if a segment of the at least one high priority ABR content item is not yet complete, deferring downloading of a next segment of the at least one low priority ABR content item until the segment of the at least one high priority ABR content item is complete.

13. A non-transitory computer-readable medium that stores a set of instructions which when executed perform a method comprising:
receiving a request for a download of at least one high priority adaptive bitrate (ABR) content item that must be downloaded in time to avoid underrun and a request for a download of at least one low priority ABR content item that does not require a real time download, the at least one high priority ABR content item being available for download at a first higher bit rate and at a first lower bit rate, and the at least one lower ABR content item being available for download at a second higher bit rate and at a second lower bit rate;
determining a required bandwidth to download the at least one high priority ABR content item without adapting to the first lower bit rate and a remaining bandwidth to download the at least one low priority ABR content item on the basis of an available bandwidth for downloading ABR content and the required bandwidth;
interfacing with at least one ABR server;
downloading the at least one high priority ABR content item and the at least one low priority ABR content item, wherein downloading the at least one low priority ABR content comprises:
determining a new segment size of the at least one low priority ABR content item which is of a smaller time length than an originally determined segment time length of the at least one low priority ABR content item based on the available bandwidth of for downloading the at least one low priority ABR,
requesting the at least one low priority ABR content item within a byte offset from a start of the originally determined segment, and
waiting for a predetermined time before requesting a next segment of the at least one low priority ABR content item; and
allocating, based on the available bandwidth, at least the required bandwidth and up to the remaining bandwidth;
reallocating, upon a drop occurring in the available bandwidth, the remaining bandwidth resulting from the drop in available bandwidth, based on the new segment size; and
unequally allocate the remaining bandwidth among at least two low priority ABR content items upon receipt of requests for download of at the least two low priority ABR content items.

14. The non-transitory computer-readable medium according to claim 13, wherein, upon receipt of requests for download of at least two low priority ABR content items, allocating equally allocates the remaining bandwidth among the at least two low priority ABR content items.

15. The computer-readable medium according to claim 13, wherein, upon completion of a download of a segment of the at least one low priority ABR content item, if a segment of the at least one high priority ABR content item is not yet complete, downloading of a next segment of the at least one low priority ABR content item is deferred until the segment of the at least one high priority ABR content item is complete.

* * * * *